United States Patent
Harrison et al.

(10) Patent No.: US 8,019,287 B2
(45) Date of Patent: Sep. 13, 2011

(54) ON DEMAND ANTENNA FEEDBACK

(75) Inventors: Robert M. Harrison, Grapevine, TX (US); Mansoor Ahmed, Hurst, TX (US); Zhijun Cai, Euless, TX (US)

(73) Assignee: Motorola Mobility, Inc., Libertyville, IL (US)

( * ) Notice: Subject to any disclaimer, the term of this patent is extended or adjusted under 35 U.S.C. 154(b) by 1157 days.

(21) Appl. No.: 11/462,759

(22) Filed: Aug. 7, 2006

(65) Prior Publication Data

US 2008/0032633 A1    Feb. 7, 2008

(51) Int. Cl.
*H04B 1/00* (2006.01)
*H04B 7/00* (2006.01)

(52) U.S. Cl. ............... 455/69; 455/68; 455/70; 455/561; 455/562.1; 455/67.11; 455/67.13

(58) Field of Classification Search ............... 455/67.11, 455/67.13, 68–70, 561, 562.1
See application file for complete search history.

(56) References Cited

U.S. PATENT DOCUMENTS

| | | | | |
|---|---|---|---|---|
| 5,905,473 | A * | 5/1999 | Taenzer | 343/834 |
| 6,671,495 | B1 * | 12/2003 | Lappetelainen et al. | 455/67.11 |
| 7,047,046 | B2 * | 5/2006 | Hoffmann et al. | 455/562.1 |
| 7,308,285 | B2 * | 12/2007 | Nelson et al. | 455/562.1 |
| 2002/0094843 | A1 | 7/2002 | Hunzinger | |
| 2005/0201296 | A1 | 9/2005 | Vannithamby et al. | |

OTHER PUBLICATIONS

Youngseok Jin, Bin-Chul Ihm, Jinyoung Chun, "Feedback request subheader", IEEE 802.16 Broadband Wireless Access Working Group, LG Electronics, Inc., Jan. 10, 2005, 4 pages.
3rd Generation Partnership Project; Technical Specification Group Radio Access Network; Physical channels and mapping of transport channels onto physical channels (FDD) (Release 7), 3GPP TS 25.211 V7.0.0 (Mar. 2006), 41 pages.
3rd Generation Partnership Project; Technical Specification Group Radio Access Network; Continuous Connectivity for Packet Data Users; (Release 7), 3GPP TR 25.903 V1.0.0 (Jun. 2006), 104 pages.
PCT, "Notification of Transmittal of the International Search Report and the Written Opinion of the International Searching Authority, or the Declaration", Dec. 20, 2007, pp. 1-10, PCT/US2007/075342, European Patent Office.

* cited by examiner

*Primary Examiner* — Tuan A Tran
(74) *Attorney, Agent, or Firm* — Hisashi D. Watanabe; Douglas S. Rupert

(57) ABSTRACT

A feedback method in which a notification is received that a transmitting device has scheduled a transmission of data to the receiving device. Antenna feedback is generated in response to receipt of the notification. The antenna feedback is sent to the transmitting device. A mobile device includes a wireless network interface and a processor configured to receive a notification that a transmitting device has scheduled transmission of data to the mobile device, to generate antenna feedback in response to receipt of the notification, and to send the antenna feedback over the interface to the transmitting device.

27 Claims, 3 Drawing Sheets

ON DEMAND ANTENNA FEEDBACK

FIELD

The present application relates generally to wireless communication systems, and more particularly to wireless devices that transmit antenna feedback.

BACKGROUND

In wireless communications systems, antenna arrays are used as an efficient means to transmit a large amount of information in a single signal. An antenna array is a group of spaced apart antennas that can work cooperatively to transmit a signal from a transmitting device to a receiving device. When working cooperatively to transmit a signal, an antenna array produces a unique antenna pattern that is more focused on a receiving device than would be a single antenna.

Antenna arrays can produce many different antenna patterns depending on the operating parameters used with individual antennas. The best antenna pattern to use for a particular transmission is variable and depends on factors, such as the nature of the transmission, the type of receiving device, the location and conditions surrounding the transmitting device, the location and conditions surrounding the receiving device, and so on. To enhance the capabilities of antenna arrays, many wireless systems provide mechanisms by which wireless devices can send antenna feedback to base stations. The antenna feedback allows a receiving device to request a particular antenna pattern from a base station.

Current antenna feedback schemes operate such that wireless devices repeatedly transmit antenna feedback to base stations regardless of whether they are receiving data or not. These schemes waste system resources and bandwidth used for this unneeded feedback. Accordingly, an approach is needed that provides for the on demand transmission of antenna feedback from a receiving device to a transmitting device.

SUMMARY

In one embodiment, a feedback method in a receiving device is provided. A notification is received that a transmitting device has scheduled a transmission of data to the receiving device. Antenna feedback is generated in response to receipt of the notification. The antenna feedback is sent to the transmitting device.

In one embodiment, a mobile device is provided. The mobile device includes a wireless network interface. A processor is configured to receive a notification that a transmitting device has scheduled transmission of data to the mobile device, to generate antenna feedback in response to receipt of the notification, and to send the antenna feedback over the interface to the transmitting device.

In one embodiment, a method, in a transmitting device, of initiating feedback from a receiving device is provided. A notification is sent that the transmitting device will send data to the receiving device. The notification serves a request for antenna feedback from the receiving device. Antenna feedback is received from the receiving device. Data is transmitted to the receiving device through utilization of the antenna pattern.

BRIEF DESCRIPTION OF THE DRAWINGS

For the purpose of facilitating an understanding of the subject matter sought to be protected, there are illustrative embodiments in the accompanying drawing, from an inspection of which, when considered in connection with the following description and claims, the subject matter sought to be protected, its construction and operation, and many of its advantages should be readily understood and appreciated

DETAILED DESCRIPTION

Figure 1:
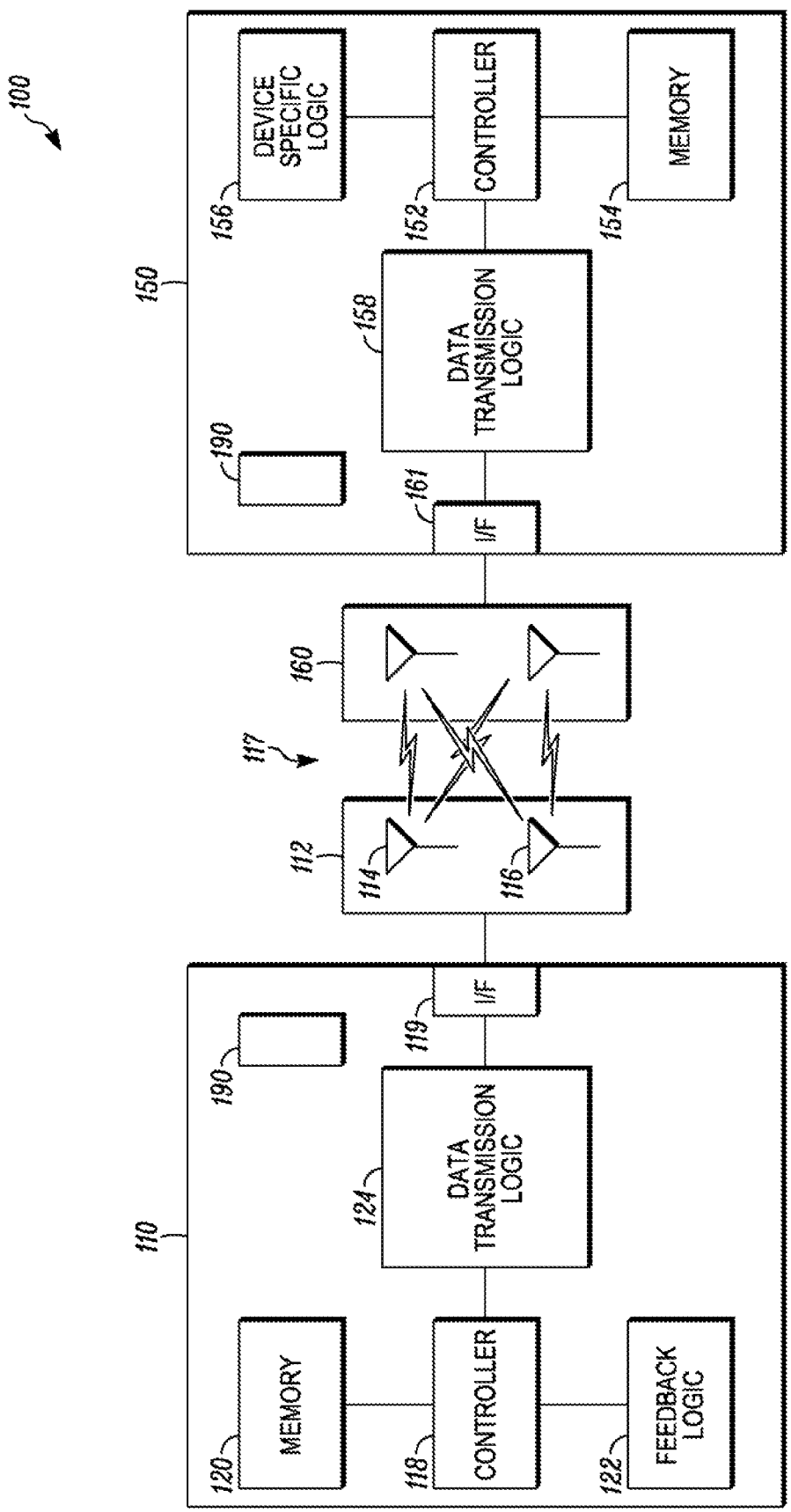
FIG. 1 is a block diagram depicting an exemplary system including a transmitting device and a receiving in which on demand antenna feedback is utilized.

Referring to FIG. 1, a system 100 includes a transmitting device 110 and a receiving device 150. The terms "transmitting device 110" and "receiving device 150" have been chosen as useful to describe the functionality herein. It will become apparent further herein, however, that the transmitting device 110 and receiving device 150 are bi-directional devices. Therefore, transmitting device 110 is not only a transmitter and receiving device 112 is not only a receiver. Furthermore, it will be recognized that in a wireless communication system there could be multiple transmitting devices and receiving devices. Therefore, each transmitting device 110 can in actuality service one or more receiving devices 150, and each receiving device 150 can receive service from one or more transmitting devices 110.

System 100 in one example is a wireless communications system in which transmitting device 110 is a base station that provide service to receiving device 150. In one example, system 100 is a currently employed wireless communication system or a wireless communication system under development. Examples of such systems include, but are not limited to systems such as GSM, GPRS, CDMA, IDEN, 2.5G, and 3G, and WiMAX (802.16e) systems that use modulation formats such as QPSK, DQPSK, OQPSK, BPSK, QAM, and spread spectrum multiple access (such as CDMA, OFDMA) and non-spread spectrum (such as TDMA or FDMA) multiple access techniques or variations and evolutions thereof that are suitable for use with adaptive antenna arrays or alternative transmission modes such as variable data rate complex modulation techniques.

Referring further to FIG. 1, transmitting device 110 in one example is a base transceiver system for a cellular system, available from manufacturers such as Motorola, employing a transmit antenna array 112 including two antenna elements 114, 116 to communicate with a receiving unit 150. Signals from antenna element 114 are transmitted or radiated over a communications channel and signals emanating from antenna element 116 are transported over a channel. Each channel is comprised of a plurality of paths from the radiating antenna element to the wireless communications unit. Furthermore, transmissions to one or more wireless communication units may occur over a subset of the channel, depending on the multiple access method used in the communication system. In this case, a "channel" as used herein is the portion of the channel (time, frequency, code, etc. resources) used in the transmission. The composite of all paths from all antenna elements to the antenna system of the receiving unit 150 is called and designated a channel or composite channel 117. When it is relevant, this disclosure will differentiate a channel and a composite channel herein and when not so distinguished, either explicitly or implicitly a channel can be viewed as a composite channel. Furthermore, for ease of expression, antenna array 112 is shown with two elements. Those with skill in the art, however, will recognize that the principles set forth herein are applicable to antenna arrays with more than two elements.

In one example, antenna array 112 is an adaptive antenna array and accordingly, particular weights are provided for each element 114, 116 of the array 112 to thereby optimize the composite channel 117 for communications with the receiving unit 150. As the receiving unit moves along a route, the individual channels will vary or change dramatically due in part to the characteristics of the movement and in part to encountering different obstacles and thus paths. At different locations along a route, the antenna array 112 will need to be adapted by changing antenna array weights (i.e. relative gains and phases between antenna elements) to correlate with the available and changing individual channels in order to continue to provide service to the receiving device 150. This may be done by having the receiving device 150 send antenna feedback to the transmitting device 110. The transmitting device 110 employs the antenna feedback such that the transmitting device 110 applies weights to the antenna array to provide an optimized antenna pattern. A more detailed discussion of adaptive antenna arrays and antenna feedback can be found in U.S. Pat. Nos. 6,859,503 and 6,754,475, which are hereby incorporated by reference.

The design and operation of various transmitting device 110 are known so a detailed description of each possible embodiment will be omitted. Nevertheless, to effectively illustrate the principles of operation set forth herein, transmitting device 110 is shown to include exemplary components, such as a controller 118, memory 120, feedback logic 122, and data transmission logic 124.

Controller 118 is the processor that governs transmitting device 110 and executes its core functionality. Memory 120 provides storage in which data, instructions, software routines, code sets, databases, etc. can be stored. Feedback logic 122 receives and processes antenna feedback from receiving device 150 and passes it to controller 118, which can then act to provide a requested antenna pattern for transmission to receiving device. Feedback logic 122 also receives and processes Channel Quality Indicator (CQI) data from receiving device 150 and sends it to controller 118. In one example, controller 118 employs the CQI data to determine whether or the channel 117 is of sufficient quality to transmit data. If the channel is of sufficient quality and if transmitting device 110 has data for receiving device 150 then transmitting device 110 will send a notification message to receiving device 150 to inform receiving device 150 that it is scheduled to receive data.

Data transmission logic 124 includes hardware and software components necessary to prepare data for transmission over channel 117. These components include functionality such as encoding, modulation, power allocation, and so on. Data transmission logic 124 provides signals to antenna array 112 through interface 119. Interface 119 serves to convert signals produced by data transmission logic 124 to a form usable in antenna array 112. For example, if antenna array 112 is a set of passive antenna elements, interface 119 may perform the RF functions of a transmitter, including convert baseband modulated signals to radio frequencies (RF conversion), power amplifying, etc. However, if antenna array 112 has built in power amplifiers, interface 119 would perform transmission functions including RF conversion and small signal amplification. Finally, if antenna array 112 can accept baseband signals and perform the RF functions of the transmitter, interface 119 may be a digital interface over which digitized baseband signals can be sent from the data transmission logic 124 to antenna array 112. Accordingly, controller 118 provides input to data transmission logic 124 such that the data transmission logic provides properly formatted output streams to antenna array 112 for transmission to receiving device 150. Controller also provides antenna array weights to data transmission logic 124 such that antenna array 112 provides antenna patterns in accordance with antenna feedback from receiving device 150.

Receiving device 150 in one example comprises any suitable device operative to send and/or receive data in accordance with the operation of the wireless communication system 100. Examples of receiving device 150 include, but are not limited to, cellular phones, mobile phones, pagers, radios, personal digital assistants (PDAs), mobile data terminals, laptop computers, application specific gaming devices, video gaming devices incorporating wireless modems, and combinations or subcombinations of these devices. The design and operation of these devices is well known so a detailed description of each possibility will be omitted. Nevertheless, for illustrative purposes, wireless device 150 is shown to include exemplary components, such as a controller 152, memory 154, device specific logic 156, data transmission logic 158, and antenna array 160.

Controller 152 is the processor that governs and carries out the device specific functionality of the receiving device 150. Memory 154 provides storage in which data, instructions, software routines, code sets, databases, etc. can be stored. Device specific logic 156 refers to components of receiving device that 150, not explicitly mentioned herein, that are necessary for it to perform in its intended way. For example, if receiving device 150 were a mobile phone, device specific logic 156 would include components such as a user interface, a display, etc. Data transmission logic 158 provides data signals to antenna array 160 through interface 161 and receives data from antenna array 164. Interface 161 performs RF transmissions functions similar to those of interface 119. Accordingly, controller 152 provides input to data transmission logic 158 such that the data transmission logic provides properly formatted output streams to antenna array 160 for transmission to transmitting device 110 or to another base station or receiver. Controller 152 also generates CQI feedback and antenna feedback to data transmission logic for transmittal to transmitting device 110. Antenna array 160 is connected to data transmission logic 158 through interface 161. It will be recognized that antenna array 160 and data transmission logic 158 provide an interface to a wireless network. It will be further recognized that although antenna array 160 is shown with two elements, it could include more elements.

Further referring to FIG. 1, it should be understood that the components of wireless device transmitting device 110 and receiving device 150 are formed of one or more computer software and/or hardware components. A number of such components can be combined or divided. In one example, an exemplary component of each device employs and/or comprises a series of computer instructions written in or implemented with any of a number of programming languages, as will be appreciated by those skilled in the art.

In a further example, transmitting device 110 and receiving device 150 each employ at least one computer-readable signal-bearing medium 190. An example of a computer-readable signal-bearing medium 190 is a recordable data storage medium such as a magnetic, optical, and/or atomic scale data storage medium. In another example, a computer-readable signal-bearing medium is a modulated carrier signal transmitted over a network coupled to wireless device transmitting device 110 or receiving device 150. A computer-readable signal-bearing medium 190 can store software and/or logic components that are employable to carry out the functionality described herein.

An exemplary description of the operation of system 100 to provide and employ on demand antenna feedback will now be described for illustrative purposes.

Figure 2:
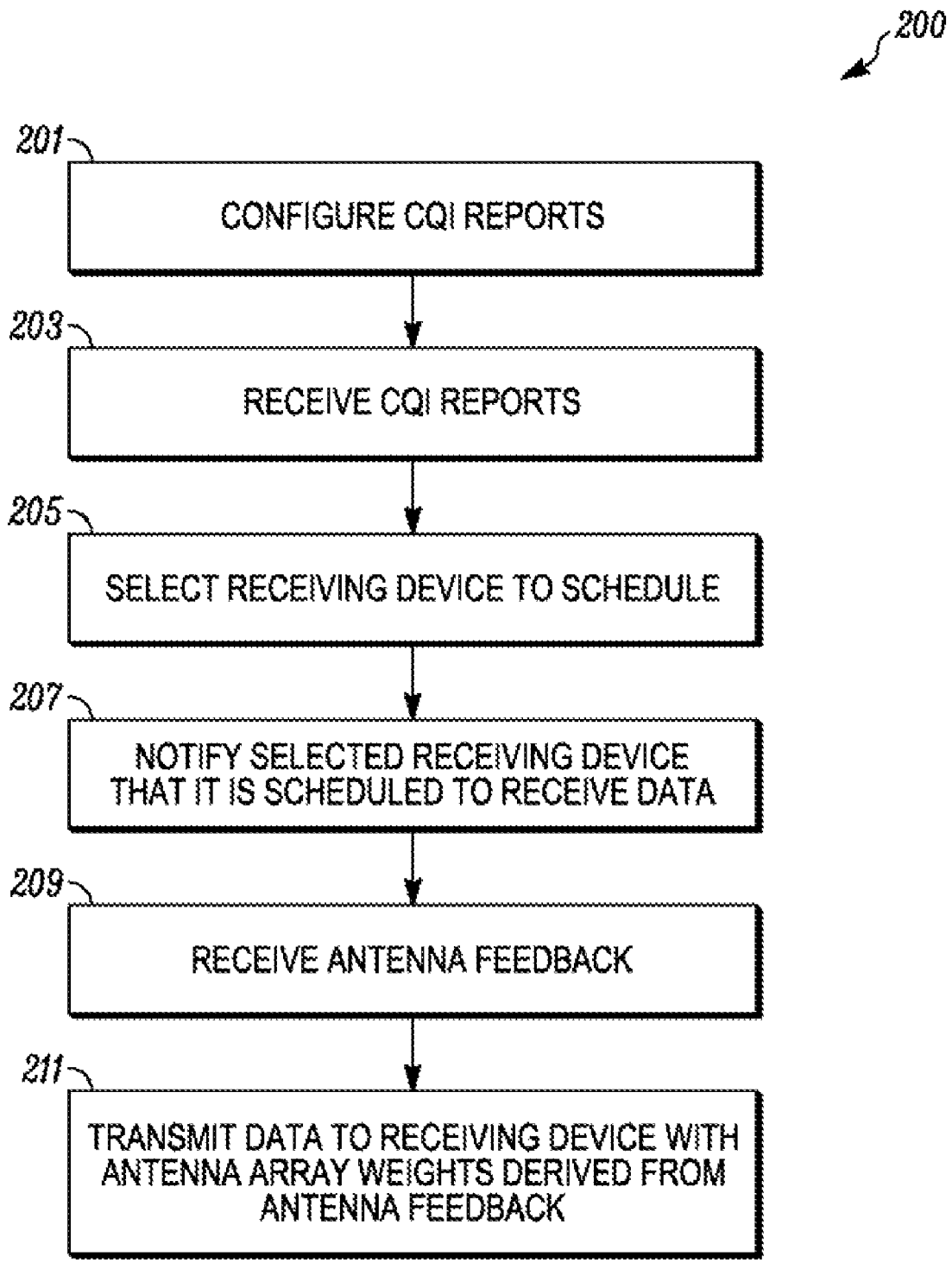
FIG. 2 is a flowchart depicting an exemplary process, in the transmitting device of FIG. 1, for providing for initiating and receiving on demand antenna feedback.

Referring to FIG. 2, a process 200 is shown which will be carried out in transmitting device 110 in order to request and employ antenna feedback. In step 201, controller 118 in transmitting device 110 configures the CQI reports in the receiving device 150 and may also configure other receiving devices that it services. In one example, configuring the CQI reports involves the controller 118 transmitting messages through data transmission logic 124 and over antenna array 112 to each receiving device that identify how the receiving device should transmit CQI reports, including how often to transmit the reports and what transmission mode (e.g. 1 antenna, closed loop transmit diversity, open loop transmit diversity, number of MIMO streams, etc.) the receiving device should assume the base will use as the UE calculates its CQI reports.

In step 203, controller 118 of transmitting device 110 receives the CQI reports through feedback receiver 122, and in step 205, the controller 118 of transmitting device 110 selects the receiving devices to which it will schedule the transmission of data. In one example, selecting the receiving devices involves determining which receiving devices have channels open to transmitting device 110 that are of sufficient quality to transmit data. In general, transmitting device 110 establishes if a channel has sufficient quality by using a scheduling algorithm. This algorithm considers the data rate supportable on each channel, the delay requirements of the traffic for each receiving device, the priority of the data, etc. Receiving devices with channels that best meet the scheduler requirements will be declared to have sufficient quality. One example of a scheduler known in the art is a "maximum C/I scheduler", which always selects the receiving device with the best CQI (that is, the one whose channel has a maximum carrier to interference ratio, and can typically support the highest data rate among receiving devices being scheduled and for which data are available.)

In step 207, the controller 118 of transmitting device 110 will notify a selected receiving device 150, on a shared control channel, that it is scheduled to receive data. In one example, the notification also serves as a notification that the receiving device 150 should start transmitting antenna feedback information. Otherwise, the receiving device 150 will not transmit antenna feedback. Therefore, system 100 bandwidth and resources are conserved because only receiving devices 150 that are actually scheduled to receive data will transmit feedback. In one example, the notification to send antenna feedback may be implied or explicit.

An implied notification in one example is a notice that the transmitting device 110 will transmit data to the receiving device 150 on the shared data channel. Therefore, whenever data is to be transmitted to the receiving device 150, the receiving device 150 would transmit antenna feedback.

An explicit notification could be one or more bits transmitted on the shared control channel that tells a receiving device 150 to transmit antenna feedback independent of whether it is scheduled or not. This could be desirable in situations where low delay antenna feedback is more critical than low delay CQI for good performance.

In one example, the controller 118 of transmitting device 110 times the transmission of the notification such that it is in the beginning of a time period during which the base station may transmit to one or more receiving devices on the downlink (a "downlink sub-frame") in order to allow the receiving device 150 to transmit antenna feedback bits in the same downlink sub-frame in response to the scheduling notification. This allows the transmitting device to use the antenna array weights, included in the antenna feedback, at the beginning of the next sub-frame, thereby reducing feedback indication (FBI) delay and improving the performance of the adaptive array when the receiving device moves at higher speeds.

As another alternative, the transmitting device 110 may transmit an "antenna feedback control indication" along with a dynamic scheduling notification to tell the receiving device 150 if it should transmit the antenna feedback in response to being scheduled.

As a further alternative, the transmitting device 110 may transmit a feedback request that includes at least one parameter by which the receiving device 150 should send feedback. For instance, the transmitting device may request that receiving device 150 provide antenna feedback for some duration D, or for M consecutive time intervals (such as sub-frames or other measures of time known to both the UE and the network) out of every N consecutive sub-frames of data received from transmitting device. The transmitting device 110 may notify the receiving device that it is schedule to receive a plurality of data sub-frames and request feedback during each of these sub-frames. In another example, the transmitting device 110 may notify the receiving device that it is schedule to receive a plurality of data sub-frames and request feedback during every nth sub-frame.

In step 209, controller 118 of transmitting device 110 receives the antenna feedback through feedback receiver 122. Controller 118 will wait until at least one bit of feedback is received from receiving device 150 before utilizing the feedback to generate a particular antenna pattern. This is done because the transmitting device 110 needs to receive enough information to select an appropriate antenna pattern to use to transmit to the receiving device 150. If an incorrect antenna pattern is used, the transmission could actually be degraded relative to if a single antenna were used. All antenna feedback bits from receiving device 150 do not have to be received in all embodiments of adaptive array systems, however, because antenna patterns that are "close" to the one requested by the receiving device 110 can still provide gain in some embodiments of adaptive array systems.

To obtain the maximum benefit from the antenna array, transmitting device 110 may delay transmitting at least a portion of the data available for receiving device 150 in a first sub-frame until it receives complete or nearly complete antenna pattern feedback. In this case, the size of the transmission to the receiving device 150 indicated in a first notification transmitted to receiving device 150 from transmitting device 110 in the current sub-frame will be smaller than the size indicated in a second notification in a subframe for which the transmitting device 110 has more complete antenna pattern feedback. For example, when receiving device 150 receives a first notification when it has not been transmitting antenna pattern feedback, the first notification could indicate that a zero size transmission will be sent in the current sub-frame, and a second notification sent after the UE has fed back the first antenna pattern will indicate that the transmission has nonzero size, where the size is selected using normal scheduling procedures. Alternatively, the first transmission sent to receiving device 150 in a first sub-frame when it has not been transmitting antenna pattern feedback could have predetermined (possibly zero) size and the size of the second transmission could still be indicated in the second notification.

Some notification mechanisms reduce the overhead of notification by indicating that one or more UEs will have data in more than one sub-frame (often called "persistent scheduling" in the art). In this case, a notification sent by transmitting device 110 when it has insufficient antenna pattern feedback from receiving device 150 would indicate at least two different sizes for at least a first and a second transmission. The first transmission would be indicated to have a smaller size than a later second transmission when it will have sufficient antenna pattern feedback. To minimize the notification overhead, the set of possible size combinations of the transmissions could be signaled in a message beforehand to receiving device 150, and an index that indicates the combination of transmission sizes used would be signaled to the UE in the notification instead of directly signaling the sizes themselves.

In step 211, the controller 118 transmitting device 110 will input the proper variables into data transmission logic 124 to produce the requested antenna pattern in the antenna feedback. Transmitting device 110 will then send the scheduled data transmission to receiving device 150 over antenna array 112 by utilizing the antenna pattern.

Figure 3:
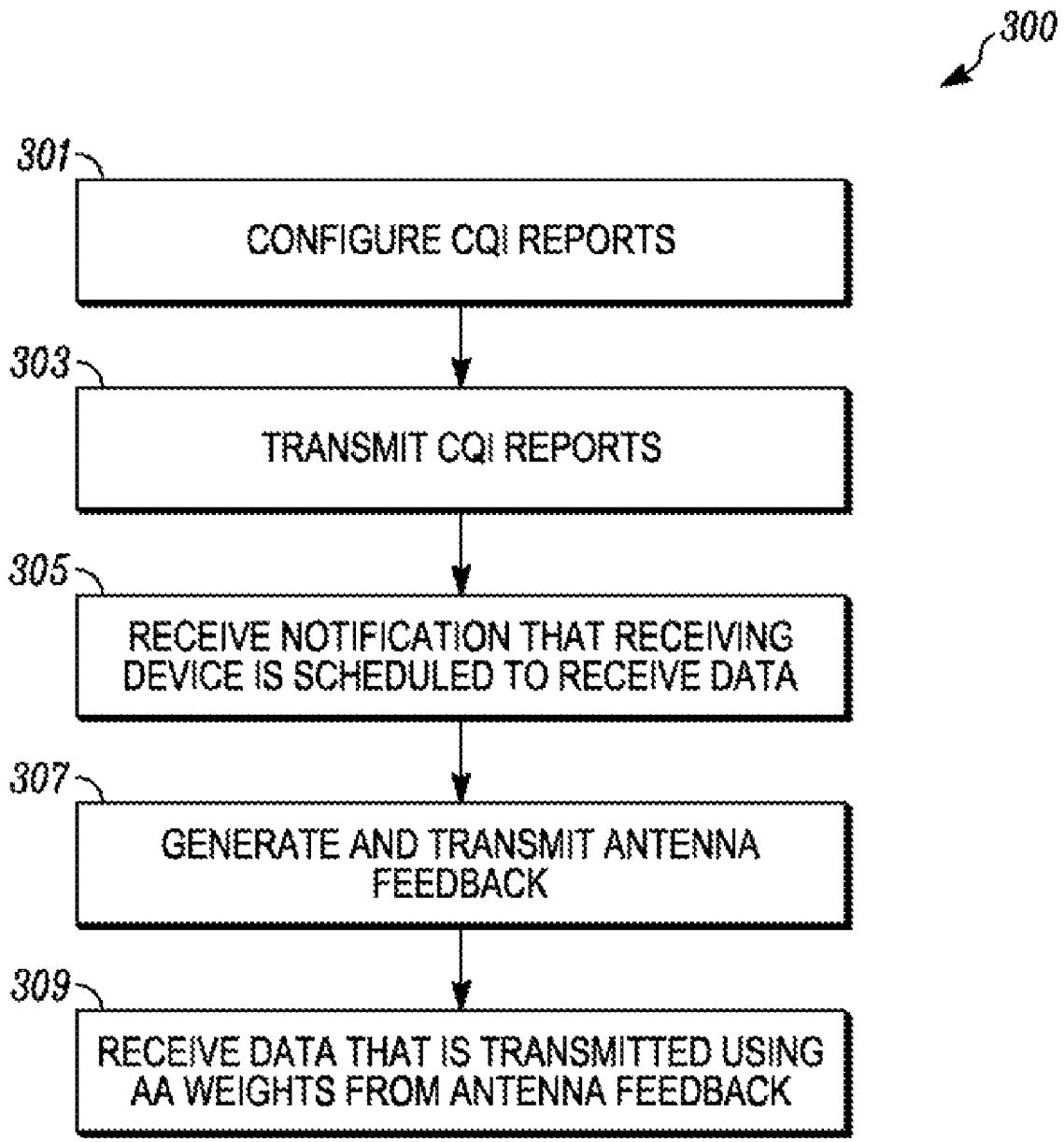
FIG. 3 is a flowchart depicting an exemplary process, in the receiving device of FIG. 1, for providing on demand antenna feedback.

Referring to FIG. 3, an exemplary process 300 for providing on demand feedback in the receiving device 150 will now be described for illustrative purposes.

In step 301, the controller 152 of receiving device 150 configures CQI reports in accordance with parameters sent from transmitting device 110 in step 201. This includes receiving and implementing the control signaling from transmitting device 110 that specifies how CQI is calculated and how and/or when it is transmitted.

In step 303, the receiving device 150 transmits CQI data. In one example, the controller 152 of receiving device 150 calculates CQIs by assuming that closed loop transmission (that is a transmission wherein the base uses an adaptive array, such as closed loop transmit diversity or closed loop MIMO) is used. The receiving device 150 receives a pilot signal (e.g. a signal known to the UE whose transmission allows the UE to measure channel responses from antenna elements or antenna arrays at a base station to one or more antennas at a UE) from transmitting device 110 and measures channel responses to each element of the antenna array 112. The receiving device 150 also determines a "best" antenna pattern, e.g. one that maximizes received power or throughput given the receiver configuration (including number of elements, equalizer algorithm, number of MIMO streams transmitted, etc.). The CQI report that the UE generates is then an indication of channel quality (such as number of bits that could be transmitted or the SINR) assuming that the best antenna pattern is used.

In step 305, the controller 152 of receiving device 150 receives notification, through data transmission logic 158, on a shared control channel that the transmitting device has scheduled a data transmission to it. This occurs in accordance with step 205 in the transmitting device 110. Therefore, the notification that receiving device 150 is scheduled serves as a notification that the receiving device should generate and send antenna feedback to transmitting device 110

In step 307, the controller 152 of receiving device will generate antenna feedback and begin to transmit the antenna feedback to transmitting device 110. Accordingly, receiving device will transmit antenna feedback. Accordingly, the controller 152 will transmit antenna feedback bits in the same downlink sub-frame use for the scheduling notification to allow the transmitting device 110 to use the antenna array weights, included in the antenna feedback, at the beginning of the next sub-frame, thereby reducing FBI delay and the performance of the adaptive array when the UE moves at higher speeds. As another alternative, the receiving device 150 will transmit antenna feedback in response to an "antenna feedback control indication" along with a dynamic scheduling notification which tells the receiving device 150 that it should transmit the antenna feedback in response to being scheduled. As a further alternative, the receiving device 150 will transmit feedback in accordance with a feedback request that includes at least one parameter by which the receiving device 150 should send feedback. For instance, the receiving device 150 will provide antenna feedback for some duration D, or for M consecutive time intervals out of every N consecutive time intervals of data received from transmitting device. The receiving device 150 may send antenna feedback during a plurality of data sub-frames during which it is to receive data. In another example, the receiving device 150 may send antenna feedback during every nth sub-frame for which it is scheduled. As another alternative, the receiving device 150 may transmit antenna feedback on uplink channels that directly correspond to downlink channels. That is, the receiving device 150 could send antenna feedback on uplink time-frequency resources that are selected based on what downlink sub: carriers are allocated or may be allocated to them. For example, in OFDM systems the receiving device 150 could be assigned unique frequency bands (or "sub-carriers") on the downlink and therefore, the uplink resource can be uniquely set, thereby avoiding having the different receiving devices transmitting (and interfering with each other) on the same uplink resource, since receiving devices can determine the uplink resource to transmit on by knowing the downlink sub-carriers they report antenna feedback for. For example, if receiving device 150 is instructed to report CQI for a given set of downlink subcarriers, those sub-carriers may be allocated to receiving device 150, and it can transmit on uplink sub-carriers that carry only feedback for those particular downlink sub-carriers. Alternatively, transmitting device 110 could allocate disjoint sets of downlink sub-carriers to receiving devices for multiple sub-frames, which would ensure that their uplink feedback did not mutually interfere for the duration of the allocation. Note that in general, any downlink physical layer resources that may be uniquely assigned of a multiple access system may be used to determine the uplink channel; spreading codes, time slots or sub-frames, etc, could be used instead of sub-carriers.

In step 309, the receiving device 150 will receive data on the shared data channel. The data will be transmitted by the transmitting device 110 by using antenna array weights. Accordingly, the receiving device 150 will compensate for any phase shifts induced by the antenna pattern used on any given transmission.

While particular embodiments have been shown and described, it will be apparent to those skilled in the art that changes and modifications may be made without departing from the principles set forth herein. The matter set forth in the foregoing description and accompanying drawings is offered by way of illustration only and not as a limitation.

The invention claimed is:

1. A feedback method in a receiving device, the method comprising:
  receiving a message containing at least one parameter identifying how the receiving device should transmit antenna feedback;
  receiving a notification that a transmitting device has scheduled a transmission of data to the receiving device;
  generating antenna feedback in response to an antenna feedback control indication associated with the notification; and
  sending the antenna feedback in accordance with the at least one parameter to the transmitting device.

2. The method of claim 1, wherein the step of receiving the notification comprises:
receiving the notification in a first sub-frame; and the method further comprising receiving data from the transmitting device in a second sub-frame, which was transmitted using the antenna feedback.

3. The method of claim 1, wherein the step of receiving the notification comprises:
receiving the notification in a first sub-frame of data, wherein the notification is positioned at a beginning portion of the first sub-frame.

4. The method of claim 3, wherein the step of sending comprises:
sending the antenna feedback prior to receiving a second sub-frame of data, thereby allowing the transmitting device to send the second sub-frame of data in accordance with the antenna feedback.

5. The method of claim 1, wherein the step of receiving the notification comprises receiving, in the notification, a plurality of sub-frames in which the transmitting device will send data to the receiving device; wherein the step of generating feedback comprises generating a plurality of antenna feedback messages; and wherein the step of sending the antenna feedback comprises sending the antenna feedback messages during receipt of the sub-frames.

6. The method of claim 1, wherein the step of receiving the at least one parameter comprises:
receiving at least one of a duration D for which the receiving device should send feedback and a number of consecutive time intervals M, out of N time intervals received from the transmitting device, during which the receiving device should send feedback data.

7. The method of claim 1, wherein the step of receiving the notification comprises:
receiving an indication that the transmitting device may transmit on a downlink channel to the receiving device; and
sending the antenna feedback over an uplink channel between the transmitting device and the receiving device, wherein the uplink channel is predefined as corresponding to the downlink channel.

8. The method of claim 1, further comprising:
receiving a pilot signal, prior to receipt of the notification, from the transmitting device over a communication channel;
utilizing the pilot signal to calculate a channel quality indicator for the communication channel; wherein the channel quality indicator is calculated using a predetermined method that is determined by the transmission mode of a transmission from the transmitting device to the receiving device.

9. The method of claim 1, wherein the step of generating antenna feedback comprises:
generating an antenna pattern request.

10. The method of claim 9 further comprising,
generating an antenna pattern request for a downlink resource that may be allocated to the receiving device
transmitting the antenna feedback on an uplink physical resource that is used only for feedback for the downlink resource.

11. A mobile device, comprising:
a wireless communication network interface; and
a processor configured to receive at least one parameter regarding how the receiving device should transmit antenna feedback, to receive a notification that a transmitting device has scheduled transmission of data to the mobile device, to generate antenna feedback in response to an antenna feedback control indication associated with the notification, and to send antenna feedback in accordance with the at least one parameter over the interface to the transmitting device.

12. The mobile device of 11, wherein the processor is further configured to receive the notification in a first sub-frame of data from the transmitting device, wherein the notification is positioned at a beginning portion of the first sub-frame.

13. The mobile device of claim 12, wherein the processor is further configured to send the antenna feedback prior to receiving a second sub-frame of data from the transmitting device, thereby allowing the transmitting device to send the second sub-frame of data in accordance with the antenna feedback.

14. The mobile device of claim 11, wherein the processor is further configured to receive an indication of a plurality of sub-frames in which the transmitting device will send data to the receiving device, to generate a plurality of antenna feedback messages, and to send the feedback messages during receipt of the sub-frames.

15. The mobile device of claim 11, wherein the at least one parameter includes at least one of a duration to send antenna feedback and consecutive time intervals M out of N time intervals, received from the transmitting device, to send antenna feedback.

16. The mobile device of claim 11, wherein the processor is further configured to receive the indication over a downlink from the transmitting device to the receiving device and to send the antenna pattern request over an uplink between the transmitting device and the receiving device, wherein the uplink is predefined as corresponding to the downlink.

17. The mobile device of claim 11, wherein the processor is configured to receive a pilot signal, prior to receipt of the notification, from the transmitting device over a communication channel, and to utilize the pilot signal to calculate a channel quality indicator for the communication channel; wherein the channel quality indicator is calculated using a predetermined method that is determined by the transmission mode of a transmission from the transmitting device to the mobile device.

18. The mobile device of claim 11, wherein the processor is further configured to generate the antenna feedback by generating an antenna pattern request.

19. A method, in a transmitting device, of initiating feedback from a receiving device, the method comprising:
sending the receiving device at least one parameter indicating how the receiving device should send feedback;
sending a notification that the transmitting device will send data to the receiving device, wherein the notification is associated with an antenna feedback control indication, and the antenna feedback control indication serves as a request for antenna feedback from the receiving device;
receiving antenna feedback from the receiving device;
determining an antenna pattern using the received antenna feedback;
transmitting data to the receiving device through utilization of the antenna pattern.

20. The method of claim 19, further comprising:
sending the notification in a first subframe;
indicating in the first subframe a first size of the data transmitted to the receiving device in the first subframe;
indicating a second size of a second subframe's data, where the size of the second subframe's data is larger than the first size;
transmitting data in the second subframe to the receiving device through utilization of the antenna pattern.

21. The method of claim 20, further comprising:
indicating the first and second sizes in the first subframe.

22. The method of claim 19, wherein the step of transmitting comprises:
transmitting the data after receiving at least one bit of antenna feedback.

23. The method of claim 19, wherein the step of sending a notification comprises:
sending the notification at the beginning of a first subframe of data; and
receiving the antenna feedback; and
transmitting a second subframe in accordance with the antenna feedback.

24. The method of claim 19, further comprising:
establishing a communication channel with the receiving device;
receiving a quality indicator of the communication channel; and
sending the notification to the receiving device if the channel indicator meets predetermined criteria.

25. The method of claim 19, further comprising:
sending the notification on a first communication channel; and
receiving the antenna feedback on a second communication channel that is predefined as corresponding to the first communication channel.

26. The method of claim 19, wherein
the at least one parameter includes at least one of a duration of time to send antenna feedback and a number of time intervals M out of N time intervals, received from the transmitting device, during which the receiving device should send antenna feedback.

27. The method of claim 19, wherein the step of receiving antenna feedback comprises receiving an antenna pattern request.

* * * * *